March 11, 1969  L. R. FREDERICKSON ET AL  3,432,752
RESONANT FREQUENCY MEASUREMENT APPARATUS HAVING A GATED
FREQUENCY INDICATING MEANS
Filed July 29, 1965  Sheet 1 of 3

INVENTORS
LYLE R. FREDERICKSON
LEON A. ROVELSKY
ROBERT L. WOOD

ATTORNEY

United States Patent Office 3,432,752
Patented Mar. 11, 1969

3,432,752
RESONANT FREQUENCY MEASUREMENT APPARATUS HAVING A GATED FREQUENCY INDICATING MEANS
Lyle R. Frederickson, Placentia, Leon A. Rovelsky, Orange, and Robert L. Wood, Santa Ana, Calif., assignors to North American Rockwell Corporation, a corporation of Delaware
Filed July 29, 1965, Ser. No. 475,770
U.S. Cl. 324—57                 5 Claims
Int. Cl. G01r 27/02

ABSTRACT OF THE DISCLOSURE

Apparatus for automatically measuring the resonant frequency of a resonant circuit. The resonant circuit to be tested is coupled to a swept frequency source. Differentiating means responsive to the output signal of the test circuit provides a signal indicative of the time rate of change of such output signal. Frequency indicating means, directly connected to the swept frequency source and responsive to the signal provided by the differentiating means, indicates that output frequency of the swept frequency source associated with a zero rate of change of the test circuit output signal.

BACKGROUND OF THE INVENTION

Field of the invention

This invention relates to a method and apparatus for automatically measuring the resonant frequency of a resonant circuit, and more particularly to means for determining the acceptibility of quantitative circuit parameters of a coil, a capacitor, or other reactive circuit wthin a resonant circuit.

Description of the prior art

Before incorporating an element, such as a coil or a capacitor, into a circuit it is often necessary to determine whether the element's parameters are within certain acceptable limits. The prior art method most commonly used to determine the inductance of a coil employs the use of a Q-meter. The coil under test forms a resonant circuit with a capacitor built into the meter. The operator must then plot the meter output (an impedance function) as a function of frequency as the frequency of the input signal is varied over a range of frequencies sufficient to indicate a minimum impedance. Once the resonance-producing frequency is found, the inductance of the coil may be calculated.

The accuracy of such determination depends upon the skill and experience of the operator and the interval at which Q-meter readings are plotted versus frequency. Increasing the number of frequencies or intervals for which Q-meter readings are plotted provides increased accuracy. However, such accuracy is obtained at the expense of additional time, often requiring as much time as fifteen to twenty-five minutes per coil. In a production or manufacturing operation, such expenditure of time reduces the effective production rate and represents large labor costs per unit item Using the method and apparatus of the present invention, one can make the same determination in but a few seconds. Where the acceptability of a large number of elements must be determined, a great saving in time, and therefore in cost, results from utilizing the method and apparatus described herein. Further, the effect of operator skill upon the accuracy of the result is reduced. Therefore, by means of the concept of the present invention, the above noted disadvantages of the prior art methods are avoided, and the resonant frequency of a resonant circuit may be efficiently, accurately, and automatically determined.

In the practice of the subject invention, the resonant frequency of a resonant circuit is determined by applying a swept frequency signal to the input of such circuit. The envelope of the resonant circuit output signal is differentiated, thereby generating a signal indicative of the rate of change of the resonant circuit output signal with respect to the swept frequency. The frequency of the applied input signal is measured during a zero rate of change of resonant circuit output, such frequency corresponding to the resonant frequency of the resonant circuit.

The apparatus of the invention for automatically measuring the resonant frequency of a resonant circuit comprises a swept frequency source for providing a swept frequency input signal to a circuit under test, a differentiating circuit adapted to be responsive to the envelope of the output signal of the circuit under test, and a freqency indicating device operatively coupled to the swept frequency source in response to a null output of the differentiating circuit, the frequency associated with such null being the resonant freqency of interest. In other words, the present invention includes a gated frequency-indicating device which is gated on by a differentiating circuit when a differentiated output signal therefrom represents a zero rate of change with respect to frequency of the output signal envelope of the resonant circuit under test.

It is therefore an object of the present invention to provide a method for accurately, consistently, and automatically measuring the resonant frequency of a resonant circuit.

Another object of this invention is to provide a fast, automatic method for determining the acceptability, according to a predetermined standard, of a reactive element or circuit.

Still another object of this invention is to provide high-speed apparatus for automatically and accurately measuring the resonant frequency of a resonant circuit.

A further object of the invention is to provide automatic, accurate, and rapid resonant-frequency measuring apparatus for determining the reactive characteristics of a test element or circuit coupled thereto.

Other objects and features of the invention will become apparent from the following detailed description when read in connection with the accompanying drawings of which:

Figure 4:
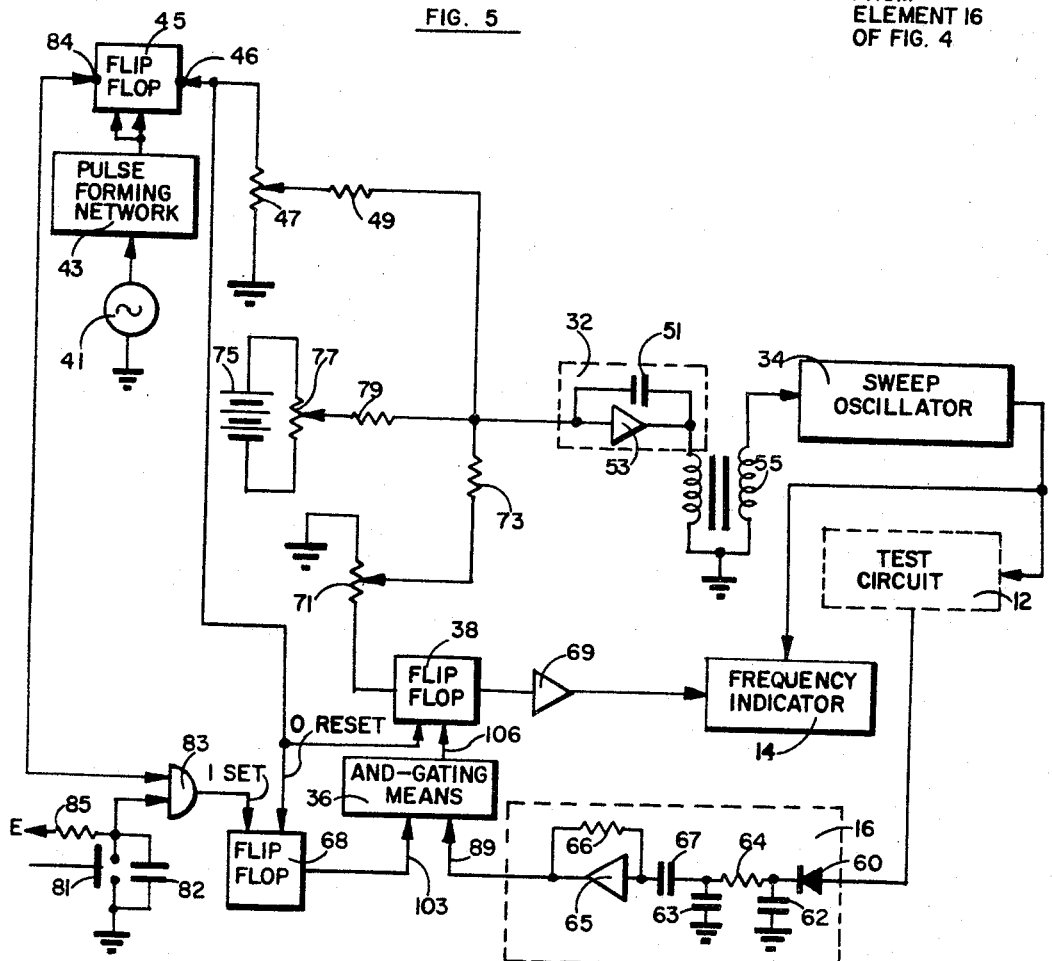
FIGURE 4 represents a preferred embodiment of the arrangement of FIGURES 1 and 3.
Figure 6:
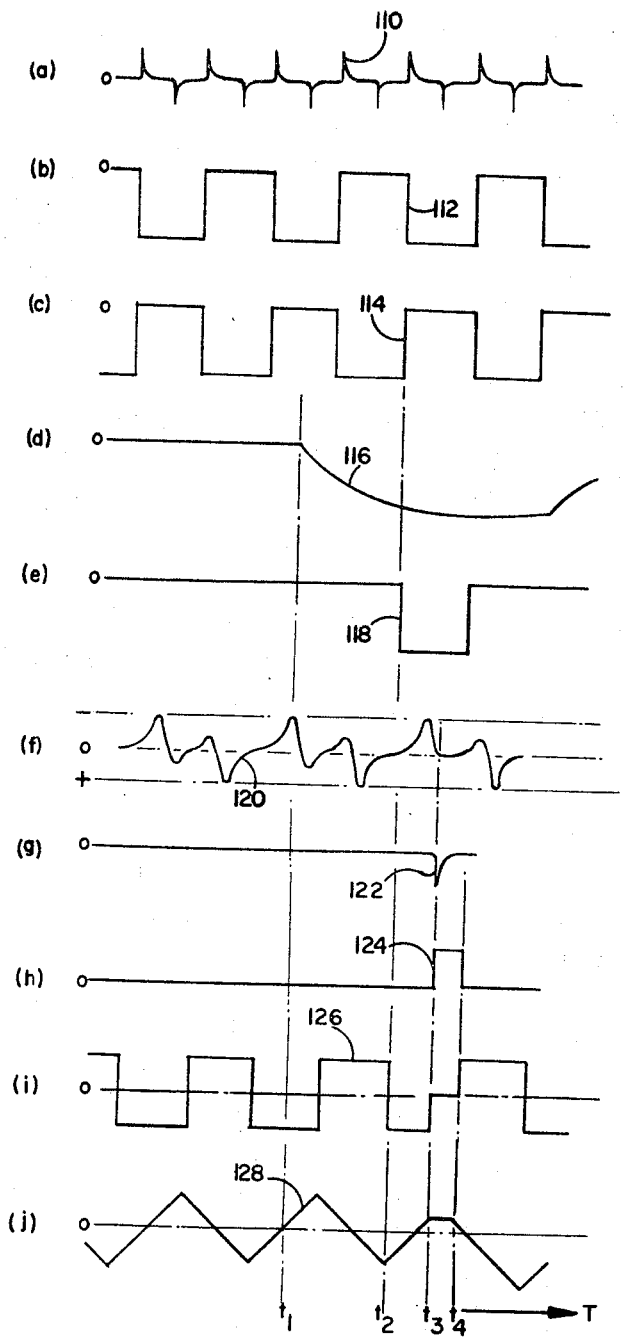

FIGURE 6 displays a family of time histories of the responses of certain elements in FIGURE 4.

Figure 1:
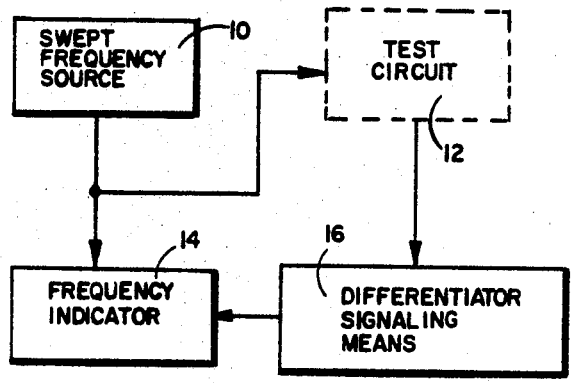
FIGURE 1 is a block diagram of a system embodying the concept of the invention.

Referring now to FIGURE 1, there is illustrated in block diagram form a system embodying the concept of the invention. There is provided a swept frequency source 10, having an output connected to both a test circuit 12 and to frequency indicating means 14. There is also provided differentiator signalling means 16, having an input responsively connected to the output of the test circuit 12, and further having an output coupled to an input of the frequency indicating means 14.

The test circuit 12 comprises a reactive element or an active resonant circuit having unknown characteristics and a proper reactive element of known characteristics together forming a resonant circuit.

In the normal operation of the arrangement of FIGURE 1, the swept frequency source 10 generates a signal, the frequency of which varies with time, and provides the excitation for the circuit 12 under test. The resonant test circuit 12 is a frequency sensitive device which provides an output signal having an envelope that varies as a function of frequency. The test circuit output signal is applied as an input to the differentiator signalling means 16, which provides an output indicative of the differentiation of the input envelope with respect to the excitation frequency. Where the excitation frequency from source 10 is swept linearly as a periodic function of time, differentiator 16 may be a circuit for providing a differentiation with respect to time. In such case, the differentiated envelope signal therefrom is yet a function of frequency because the excitation frequency varies linearly with periodic time. Accordingly, the output from differentiating means 16 is indicative of the rate of change with respect to frequency of the envelope of the test circuit output signal. The frequency indicating means 14 is gated on in response to a null output, or zero cross-over of the output from the differentiator signalling means 16. That excitation frequency applied to test circuit 12 and which gives rise to the null output from the differentiator signalling means 16, is the resonant frequency of test circuit 12.

Figure 2:
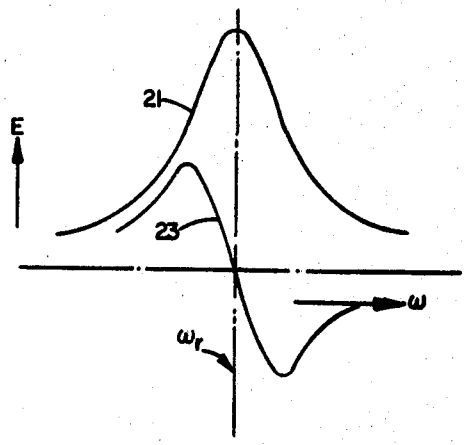
FIGURE 2 illustrates the frequency response of two elements of the arrangement of FIGURE 1.

The correspondence between the responses of the resonant test circuit 12 and the differentiator signalling means 16, as functions of frequency, is shown in FIGURE 2.

Referring to FIGURE 2, there is illustrated the frequency response of two elements of the arrangement of FIGURE 1 as a source of excitation is applied thereto. Curve 21 represents the envelope of the output signal of the resonant circuit 12 of FIGURE 1, and indicates the variation of the reciprocal of the impedance function of the resonant circuit 12 as a function of frequency. At the resonant frequency $\omega_r$, the impedance of test circuit 12 becomes a minimum, and curve 21 reaches a maximum level and has at that point a slope of zero mhos per cycle. Curve 23 represents the output of differentiator signalling means 16 of FIGURE 1, and indicates the rate of change with respect to frequency of curve 21. The zero cross-over of curve 23 occurs at the frequency associated with the maximum of curve 21, which is the resonant frequency of interest, $\omega_r$. Because the frequency of the applied excitation signal from source 10, of FIGURE 1, is cyclically scanned or varied with time, the frequency response curves 21 and 23 are also indicative of the corresponding functions of time. Hence, where the output signal of differentiator signalling means 16 of FIGURE 1, is indicative of the first derivative of the input thereto with respect to time, it is also indicative of the corresponding rate of change with respect to frequency. Therefore, the time of occurrence of a null output from differentiator signalling means 16 corresponds to the occurrence of an excitation frequency equal to the resonant frequency $\omega_r$ of the test circuit 12, of the arrangement of FIGURE 1. The use of the output of differentiator means 16 as a control function in FIGURE 1 is shown in greater particularity in FIGURE 3.

Figure 3:
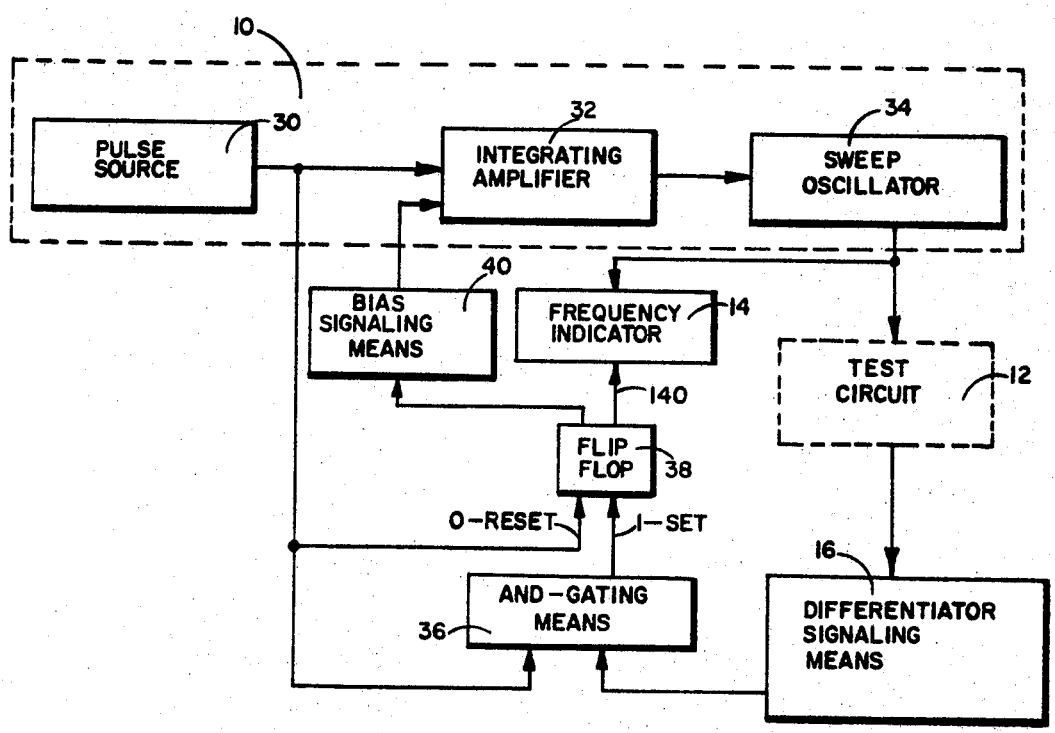
FIGURE 3 shows the inventive device of FIGURE 1 in further detail.

Referring now to FIGURE 3, there is illustrated a block diagram showing the device of FIGURE 1 in further detail, including feedback control of the swept frequency source 10. There is provided a pulse source, or square wave signal generating means, 30 for providing a periodic square-wave signal to the input of an integrating amplifier 32, thereby producing a periodic output signal from integrator 32 which changes linearly in magnitude with time and which is hereinafter referred to as a ramp signal. In other words, pulse source 30 and integrator 32 cooperate as a ramp signal source. A sweep oscillator 34 is operatively connected to the output of integrator 32, to provide a swept output signal, the frequency of which varies in accordance with the amplitude of the ramp signal. Such swept frequency signal is applied as a source of excitation to the resonant test circuit 12 and to a gated frequency indicator 14. Accordingly, pulse source 30, integrator 32, and sweep oscillator 34 comprise a swept frequency source 10.

There is also provided means for gating-on the normally gated-off frequency indicating device 14, and comprising AND-gating means 36, having one input terminal connected to the output of the differentiator signalling means 16 and another input terminal connected to receive a signal from the pulse source 30. An output from AND-gating means 36 is generated upon the coincidence of an input from pulse source 30 and the instant of zero crossover of the output signal from differentiator signalling means 16, which coincidence corresponds with the occurrence of a resonant condition in test circuit 12 due to a resonant frequency input from oscillator 34.

The means for gating the frequency indicating device 14 further comprise a flip-flop 38 having the SET or "1" state input thereof coupled to the output of gating means 36. The RESET or "0" state input of flip-flop 38 is connected to the output terminal of pulse source 30. Flip-flop 38 is turned off or reset by a pulse from source 30 and is turned on, or set to the "1" state, by a command pulse from gating means 36. A gating, or control, input 140 of gated-frequency indicator 14 is responsive to a "read" signal from flip-flop 38 (i.e., indicator 14 is gated on in response to the "1" state of flip-flop 38), thereby enabling indicator 14 to measure that frequency of the sweep oscillator 34 associated with the resonant condition of test circuit 12 and which produces such state of flip-flop 38.

An output terminal of flip-flop 38 is also connected to a bias signalling device 40. Signalling device 40, in response to the "on" or "1" state of flip-flop 38, provides a component input signal to the integrating amplifier 32 of such magnitude and polarity that the resulting net integrator input signal level is zero. The effect of such zero or null input to integrator 32 is to maintain the output thereof at a constant amplitude during the interval of such null. In other words, a fixed control input is now provided to sweep oscillator 34, which causes the resulting output thereof to be correspondingly maintained at that frequency which produced the resonant condition in test circuit 12. The interval of such fixed frequency condition facilitates the accurate measurement thereof by frequency indicator 14, which may be composed of an EPUT meter (events per unit time meter) or like device known in the art for measuring cyclical phenomena.

A preferred embodiment of the arrangement of FIGURE 3 is shown in FIGURE 4.

Referring now to FIGURE 4, there is illustrated, partially in schematic form and partially in block diagram, a preferred embodiment of the invention. There is provided a swept oscillator 34, unit-to-be-tested 12, and gated frequency measuring means 14, all constructed and arranged to cooperate substantially the same as like referenced elements of FIGURE 3. There is also provided a source 41 of alternating current which drives a pulse forming network 43 for providing an alternating pulse signal at the output thereof. A flip-flop 45, connected to receive the output signals from network 43, functions as a binary frequency divider, providing square-wave output signals having one half the frequency of the input thereto, and further having a mutually anti-phase relationship.

One output terminal 46, of the flip-flop 45, is connected to the input of an operational integrating amplifier 32 through a potentiometer 47 and a summing resistor 49. The utilization of potentiometer 47 allows adjustment of the amplitude of the input signal to integrator 32 from flip-flop 45. Integrator 32 may be comprised of an operational amplifier 53 having a capacitor 51 connected as a feedback impedance. The output of integrator 32 is coupled through a step-up transformer 55 to the input of a sweep oscillator 34. The transformer 55 is provided to boost the voltage of the output signal from integrator 32 in order to satisfy the input level requirements of the sweep oscillator 34. The frequency of the sweep oscillator output is proportional to the amplitude of the control input thereto provided by integrator 32.

A resonant circuit-to-be-tested 12 is connected to receive the variable frequency signal of the oscillator 34, and provides an output signal which is applied to the input of envelope differentiator signalling means 16, which comprises a diode envelope detector 60 and a filtering network (capacitors 62 and 63 and resistor 64) coupled to a differentiating circuit, such as, for example, the combination of an operational amplifier 65 having a feedback resistor 66 and a series input capacitor 67. The differentiated output signal from element 16 obtains a value of zero (i.e., there is a zero cross-over) at the occurrence of resonance in the test circuit 12. The output of differentiator signalling means 16 provides one of two inputs to an AND-gating means 36, more fully illustrated in FIGURE 5. A second input terminal of AND-gating means 36 is connected to the output terminal of a second flip-flop 68. Gating means 36 is responsive to the coincidence of the zero cross-over of the differentiated signal from element 16 and a selected state of second flip-flop 68 to provide an input signal to a "1" or SET input terminal of a third flip-flop 38. The "0" or RESET input terminal of flip-flop 38 is connected to the output terminal 46 of first flip-flop 45. A delay amplifier 69 interconnects a "1" state output of flip-flop 38 and the control input 140 of frequency indicator 14.

Integrating amplifier 32 is responsively coupled to the output of flip-flop 38 through a potentiometer 71 and a summing resistor 73. Potentiometer 71 provides means for adjusting the voltage level of a pulse from flip-flop 38 so that the signal voltage equals one-half of the magnitude of the signal from flip-flop 45. Also, a D-C voltage from a source 75 is applied to an input of integrator 32 by means of a potentiometer 77 and an input summing resistor 79. Potentiometer 77 allows for adjusting the level of the D-C voltage from source 75 so that the time average of the combined input to integrator 32 from summing resistors 49 and 79 is zero. In other words, the purpose of elements 75, 77 and 79 is to offset bias the D-C average of the cyclical input from resistor 49 to prevent drift in the output of integrator 32.

A normally closed switch 81 is provided to initiate the resonant frequency measurement of the test circuit 12. Upon opening switch 81, a capacitor 82, a resistor 85 and a potential source E cooperate to provide a signal which is applied to one input of an AND gate 83. A second input of gate 83 is connected to a second output terminal 84 of flip-flop 45. The output of AND gate 83 is connected to the "1" or SET input of the flip-flop 68. A "0" or RESET input terminal of flip-flop 68 is connected to the output terminal 46 of flip-flop 45. The output of flip-flop 68 is fed to an input of AND gating means 36, the construction and arrangement of which element is illustrated more fully in FIGURE 5.

Figure 5:
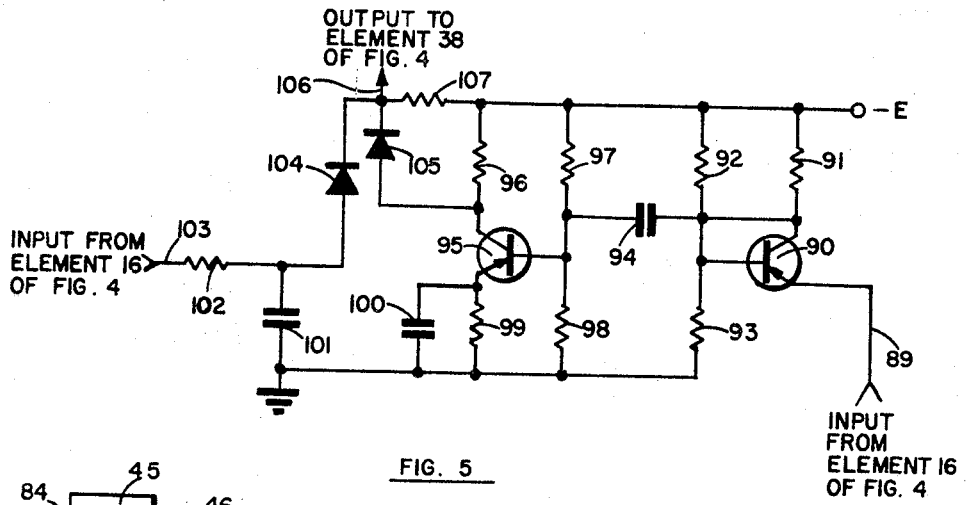
FIGURE 5 is a detailed circuit diagram of an element in FIGURE 4.

Referring to FIGURE 5, a detailed circuit is shown of the AND-gating means 36 of FIGURE 4. There is provided a transistor 90, (with associated collector load resistor 91, and base biasing resistors 92 and 93) whose emitter electrode functions as an input terminal 89 to the circuit and is connected to the output of the differentiator signalling means 16 of FIGURE 4. A coupling capacitor 94 interconnects the collector electrode of transistor 90 and the base electrode of a second transistor 95 (having associated collector load resistor 96, base biasing resistors 97 and 98 and emitter resistor 99). A second capacitor 100, connected across emitter resistor 99, provides increased a A-C gain within transistor 95. A third capacitor 101 and an input resistor 102 cooperate to perform a slight amount of integration of a step input function at the second input 103 of the device of FIGURE 5. Input terminal 103 connects to the output of flip-flop 63 of FIGURE 4. There is also provided a pair of blocking diodes 104 and 105 whose interconnected anodes form a junction at the output terminal 106 of the AND-gating circuit, the cathode of diode 104 being connected through resistor 102 to input 103, and the cathode of diode 105 being connected to the collector electrode of transistor 95. The junction 106 of diodes 104 and 105 is also connected through resistor 107 to a potential source (—E).

In normal operation of the circuit of FIGURE 5, the transistor 95 is biased at slightly above saturation. A current path is thereby provided, including resistor 99, between diode 105 and ground. Diode 105 remains in the conductive state until transistor 95 becomes cut-off. The input potential at terminal 103 is maintained at approximately zero so long as flop-flop 68, of FIGURE 4, is held in the "0" or off state. Diode 104 remains in the conductive state under these conditions. An output signal will appear at terminal 106 *only* during the interval when both diodes 104 and 105 are simultaneously nonconductive.

Transistor 90 operates as a grounded base amplifier biased at class A operation to amplify only the zero cross-over portion of the input signals (see FIGURE 6(*f*), curve 120) applied at terminal 89. A positive-going zero excursion input signal causes transistor 90 to conduct and provide a positive signal at the base of transistor 95, thereby momentarily cutting off transistor 95. This results in similarly cutting off diode 105. Diode 104 will be cut off upon application of a negative step function at terminal 103. This negative signal results when flip-flop 68, of FIGURE 4, is switched to the "1" or "on" state in response to the actuation of the measurement initiating switch 81, of FIGURE 4.

The input signal applied at terminal 89 (by differentiator 16 of FIGURE 4) is amplified first by transistor 90 and then by transistor 95 so that only the region of the signal very near zero cross-over (and, for the circuit as shown, only the positive-going portion of such signal) effects cut-off transistor 95. If this occurs while a negative step function is applied at terminal 103, a negative-going output signal, or spike, will appear at terminal 106 as a result of the source (—E) appearing across resistor 107.

The cooperation of the device of FIGURE 5 with the system of FIGURE 4 may be more easily appreciated by reference to FIGURE 6.

Referring to FIGURE 6, there is illustrated a family of time histories of the responses of several elements of FIGURE 4. The pulse forming network 43, of FIGURE 4, provides an output signal shown as curve 110 in FIGURE 6(*a*). Curves 112 and 114 of FIGURE 6(*b*) and 6(*c*), represent the respective output signals generated at the output terminals 46 and 84, respectively, of the binary-frequency dividing flip-flop 45, of FIGURE 4, which signals are mutually anti-phase and have a periodicity twice that of the output of element 43 (curve 110).

FIGURE 6(*d*), curve 116, represents the input signal to AND-gate 83, of FIGURE 4 from switch 81. Curve 118, of FIGURE 6(*e*) represents the output of flip-flop 68 of FIGURE 4. Curves 120, 122 and 124 of FIGURES 6(*f*), 6(*g*) and 6(*h*) represent the respective outputs of differentiator signalling means 16, AND-gating means 36 and flip-flop 38 respectively of FIGURE 4. Curves 126 and 128 of FIGURES 6(*i*) and 6(*j*) represent the respective input of integrating amplifier 32 and sweep oscillator 34, respectively, of FIGURE 4.

When signal source 41 of FIGURE 4 is activated, the square wave of curve 112 (of FIGURE 6) appears at output terminal 46 of FIGURE 4. This square wave is summed with the output of source 75 of FIGURE 4 to provide the input, curve 126 of FIGURE 6, to integrator 32 of FIGURE 4. The integrator output signal, curve 128 of FIGURE 6, is a periodically linearly varying or ramp function (prior to $t_3$) in response to the periodic square wave input thereto (curve 126 prior to $t_3$). The frequency of oscillator 34 of FIGURE 4 varies directly with the level of the control signal input thereto, and therefore varies as the ramp input varies. Accordingly, the frequency of the excitation signal fed to the input of the resonant test circuit 12 varies with cyclical time.

As the frequency of the input signal to test circuit 12 (in FIGURE 4) rises from below the resonant frequency thereof to a frequency greater than resonant frequency, circuit 12 passes through the resonant state. The envelope of the output signal from test circuit 12 (corresponding to curve 21 of FIGURE 2) is detected and differentiated in the differentiator signalling means 16 (of FIGURE 4), which provides a sense-inverted output signal shown as curve 120 in FIGURE 6(f) (corresponding to curve 23 of FIGURE 2). AND-gating means 36 is responsive to the positive-going zero cross-over point of the signal (represented by curve 120 at $t_3$, for example) to gate-on the normally gated-off frequency indicator 14, of FIGURE 4.

Upon the initiation of a measurement signal, accomplished by closing switch 81, of FIGURE 4, and shown by curve 116 at time $t_1$, the cyclical response of the apparatus of FIGURE 4 is interrupted. The measurement signal, from switch 81, is applied at the input of AND-gate 83, of FIGURE 4, and upon the coincidence of such signal and the occurrence of the next positive-going edge of the signal (shown in FIGURE 6(c) as curve 114 at time $t_2$), an output signal from gate 83 is generated which causes flip-flop 68 to change states. Flip-flop 68 now provides a step input signal (shown as curve 118 between $t_2$ and $t_4$) to the second input of AND-gating means 36. During the interval of this signal (between $t_2$ and $t_4$), a positive-going zero cross-over of the differentiator signal occurs, shown by curve 120 at time $t_3$. As described in connection with FIGURE 5, this cross-over condition results in an output spike signal from means 36, shown as curve 122 at $t_3$. Flip-flop 38 responds thereto by changing state and provides an output signal (curve 124 between $t_3$ and $t_4$) for gating-on frequency indicator 14 and for driving the input signal (curve 126 between $t_3$ and $t_4$) to integrator 32 to zero. The effect of the zero integrator input at time $t_3$ is to cause a plateau in the input signal to the sweep oscillator 34 (curve 128 between $t_3$ and $t_4$). The frequency of the oscillator 34 is momentarily held constant, allowing for a more accurate measurement thereof by frequency indicator 14, the measurement initiating input signal to which has been very slightly delayed by amplifier 69.

In other words, the normally gated-off frequency indicator 14 is gated-on, while the sweep oscillator frequency is momentarily held constant, in response to the resonance condition within the test circuit 12. Therefore, the frequency measured by indicator 14 is the resonant frequency of interest. Accuracy of measurement, automatic operation, and simplicity in the method of setting up the test are some of the more important advantages to be realized by utilizing the apparatus described herein.

It is to be appreciated that although the above described improved means for determining the resonant frequency of a resonant device has been described in relation to electrical elements, the concept of the invention is not limited thereto, the principals being adaptable to resonant frequent measurement of mechanical elements as well.

We claim:
1. Apparatus for automatically measuring the resonant frequency of a resonant circuit, comprising
    a voltage-controlled frequency source having an output terminal adapted to be connected to the input of a circuit to be tested for providing a periodic variable frequency output signal,
    differentiating means having an input terminal adapted to be connected to the output of a circuit to be tested for providing an output signal indicative of the rate of change with respect to frequency of the input to said differentiating means,
    controlling voltage means having an input responsively connected to the output of said differentiating means and having an output operatively connected to said voltage controlled frequency source for momentarily providing a uniform frequency output signal from said voltage-controlled frequency source upon the occurrence of said output of said differentiating means indicating a zero rate of change, and
    gated frequency indicating means directly coupled to an output of said voltage-controlled frequency source and having a gate control input responsively coupled to said differentiating means for measuring the output frequency of said frequency source upon the occurrence of an output of said differentiating means indicative of a zero rate of change with respect to frequency of an input thereto.

2. Apparatus for automatically measuring the resonant frequency of a resonant circuit, comprising
    signal generating means providing output signals having a progressively increasing waveform;
    a voltage-controlled frequency source responsively coupled to said signal generating means and having an output adapted to be connected to the input of a circuit to be tested for providing a periodic output signal having a frequency which varies in accordance with the output of said signal generating means;
    differentiating means having an input terminal adapted to be connected to the output of a circuit to be tested for providing an output signal indicative of the rate of change with respect to frequency of the input to said differentiating means,
    control means having an input responsively connected to the output of said differentiating means and an output operatively connected to said signal generating means for preventing further progressive increases in said signal generating means waveform upon the occurrence of an output of said differentiating means indicative of a zero rate of change with respect to frequency of an input thereto, and
    gated frequency indicating means directly coupled to an output of said frequency source means and having a gate control input responsively coupled to said differentiating means for measuring the output frequency of said frequency source upon the occurrence of an output of said differentiating means indicative of a zero rate of change with respect to frequency of an input thereto.

3. Apparatus for automatically measuring the resonant frequency of a resonant circuit, comprising
    a signal generating means for generating a periodic sequence of square wave signals,
    integrating means having an input connected to said signal generating means for producing integrated output signals of a progressively increasing waveform,
    a voltage controlled frequency source connected to said integrating means for providing an output frequency which varies in accordance with the magnitude of said integrated output and having an output adapted to cooperate with a resonant circuit under test,
    differentiating means having an input terminal adapted to be responsive to an output signal from said resonant circuit for differentiating the envelope of said output signal,
    gated frequency measuring means coupled to the output of said frequency source,
    gate control means responsive to the output of said differentiating means and said signal generating means for gating off the input of said integrator and gating on said frequency measuring means, upon the coincidence of one of said square wave signals and a zero crossover of said output of said differentiating means.

4. Apparatus for automatically measuring the resonant frequency of a resonant circuit, comprising
    a first generating means for generating a periodic sequence of square wave signals,
    integrating means having an input connected to said first signal generating means for producing integrated output signals of a pregressively increasing waveform, a voltage controlled frequency source connected to said integrating means for providing an output frequency which varies in accordance with the magnitude of said integrated output signals and having an output adapted to cooperate with a resonant circuit under test, differentiating means having an input terminal adapted to be responsive to an output signal from said resonant circuit for differentiating the envelope of said output signal, gate control means responsive to the output signal of said differentiating means and said first generating means for providing a gating signal upon the coincidence of one of said square wave signals and a zero cross-over of the output signal of said differentiating means, bias signaling means responsively connected to said gate control means for generating a signal which is applied to the input terminal of said integrating means for providing a net zero voltage input thereto, and gated frequency measuring means coupled to the output of said frequency source and having an input responsive to said gating signal from said gate control means for measuring said output frequency from said frequency source upon the occurrence of a zero cross-over of the output signal of said differentiating means.

5. Apparatus for automatically measuring the resonant frequency of a resonant circuit, comprising a first signal generating means for generating a periodic sequence of square-wave signals, integrating means having an input connected with said first signal generating means and providing an integrated output signal of a progressively increasing waveform, a voltage controlled frequency source connected to said integrating means for providing an output frequency which varies directly with the magnitude of said integrated output signal and having an output adapted to cooperate with the input of a resonant circuit under test, differentiating means having an input adapted to be responsive to an output signal from said resonant circuit for providing a signal indicative of the rate of change with respect to frequency of said resonant circuit output signal, measurement initiating means for providing a measure signal when a frequency measurement is required, gate control means responsive to the output signal of said differentiating means and to said measure signal for providing a gating signal upon the coincidence of said measure signal and a zero cross-over of said output signal of said differentiating means, bias signaling means responsively connected to said gate control means for generating a signal which is applied to the input terminal of said integrating means for providing a zero net voltage input thereto, and gated frequency measuring means coupled to the output of said frequency source and having an input responsive to said gating signal from said gate control means for measuring said output frequency from said frequency source upon the occurrence of a zero cross-over of the output signal of said differentiating means.

References Cited

UNITED STATES PATENTS

| | | | |
|---|---|---|---|
| 3,005,151 | 10/1961 | Ule | 324—83 XR |
| 3,138,761 | 6/1964 | Di Matted | 328—150 XR |
| 3,217,248 | 11/1965 | Itzkan | 324—81 XR |

RUDOLPH V. ROLINEC, *Primary Examiner.*

E. E. KUBASIEWICZ, *Assistant Examiner.*

U.S. Cl. X.R.

324—81